US012689477B2

(12) United States Patent
Karjalainen et al.

(10) Patent No.: US 12,689,477 B2
(45) Date of Patent: Jul. 21, 2026

(54) UPLINK (UL) SOUNDING REFERENCE SIGNAL (SRS) RESOURCE CONFIGURATION

(71) Applicant: Nokia Technologies Oy, Espoo (FI)

(72) Inventors: Juha Pekka Karjalainen, Oulu (FI); Mihai Enescu, Espoo (FI); Hiromasa Umeda, Tokyo (JP); Pasi Eino Tapio Kinnunen, Oulu (FI); Kyoungmin Park, Seoul (KR)

(73) Assignee: NOKIA TECHNOLOGIES OY, Espoo (FI)

( * ) Notice: Subject to any disclaimer, the term of this patent is extended or adjusted under 35 U.S.C. 154(b) by 411 days.

(21) Appl. No.: 18/554,017

(22) PCT Filed: Apr. 1, 2022

(86) PCT No.: PCT/EP2022/058742
§ 371 (c)(1),
(2) Date: Oct. 5, 2023

(87) PCT Pub. No.: WO2022/214397
PCT Pub. Date: Oct. 13, 2022

(65) Prior Publication Data
US 2024/0121053 A1       Apr. 11, 2024

Related U.S. Application Data

(60) Provisional application No. 63/171,392, filed on Apr. 6, 2021.

(51) Int. Cl.
H04L 5/00 (2006.01)
(52) U.S. Cl.
CPC .......... H04L 5/0048 (2013.01); H04L 5/0094 (2013.01)

(58) Field of Classification Search
None
See application file for complete search history.

(56) References Cited

U.S. PATENT DOCUMENTS

2009/0207793 A1*   8/2009   Shen ..................... H04L 1/1861
                                                            370/329
2019/0109732 A1*   4/2019   Choi ..................... H04L 5/0051
                              (Continued)

FOREIGN PATENT DOCUMENTS

AU        2018367796 A1      2/2020
EP           3675404 A1      7/2020

OTHER PUBLICATIONS

"3rd Generation Partnership Project; Technical Specification Group Radio Access Network; NR; Physical channels and modulation (Release 16)", 3GPP TS 38.211, V16.4.0, Dec. 2020, pp. 1-133.
(Continued)

*Primary Examiner* — Brandon M Renner
(74) *Attorney, Agent, or Firm* — SQUIRE PATTON BOGGS (US) LLP

(57)        ABSTRACT

Systems, methods, apparatuses, and computer program products for uplink (UL) sounding reference signal (SRS) resource configuration may be provided. UL SRS resource configuration and related transmission procedures for intra-slot and inter-slot time bundling of one or more resources may be provided. In this regard, transmission bandwidth and/or repetition factors may be adapted for SRS occasions. The adaptation may be performed across an SRS bandwidth, and on an intra-slot or inter-slot basis.

20 Claims, 7 Drawing Sheets

(56) References Cited

U.S. PATENT DOCUMENTS

| | | | |
|---|---|---|---|
| 2020/0106647 A1* | 4/2020 | Chen | H04W 72/04 |
| 2020/0350970 A1* | 11/2020 | Liu | H04B 1/713 |
| 2022/0303087 A1* | 9/2022 | Sun | H04L 5/0053 |
| 2023/0079945 A1* | 3/2023 | Manolakos | H04L 5/006 |
| | | | 370/329 |
| 2023/0086144 A1* | 3/2023 | Roy | G01S 7/006 |
| | | | 370/329 |

OTHER PUBLICATIONS

"3rd Generation Partnership Project; Technical Specification Group Radio Access Network; NR; User Equipment (UE) radio transmission and reception; Part 1: Range 1 Standalone (Release 17)", 3GPP TS 38.101-1, V17.0.0, Dec. 2020, pp. 1-488.
"3rd Generation Partnership Project; Technical Specification Group Radio Access Network; NR; User Equipment (UE) radio transmission and reception; Part 2: Range 2 Standalone (Release 17)", 3GPP TS 38.101-2, V17.0.0, Dec. 2020, pp. 1-180.
"3rd Generation Partnership Project; Technical Specification Group Radio Access Network; NR; Multiplexing and channel coding (Release 16)", 3GPP TS 38.212, V16.4.0, Dec. 2020, pp. 1-152.
"3rd Generation Partnership Project; Technical Specification Group Radio Access Network; NR; Physical layer procedures for control (Release 16)", 3GPP TS 38.213, V16.4.0, Dec. 2020, pp. 1-181.
"3rd Generation Partnership Project; Technical Specification Group Radio Access Network; NR; Physical layer procedures for data (Release 16)", 3GPP TS 38.214, V16.4.0, Dec. 2020, pp. 1-169.
"3rd Generation Partnership Project; Technical Specification Group Radio Access Network; NR; Radio Resource Control (RRC) protocol specification (Release 16)", 3GPP TS 38.331, V16.3.1, Jan. 2021, pp. 1-932.
International Search Report and Written Opinion received for corresponding Patent Cooperation Treaty Application No. PCT/EP2022/058742, dated Jul. 8, 2022, 14 pages.
"Uplink Positioning Solutions: design and evaluations", 3GPP TSG RAN WG1 96, R1-1903140, Agenda Item: 7.2.10.1.2, Ericsson, Feb. 25-Mar. 1, 2019, pp. 1-7.
Office action received for corresponding European Patent Application No. 22720941.8, dated Jun. 25, 2025, 6 pages.

* cited by examiner

100

102: UL SRS configuration
for multiple SRS
transmission occasions

Network
Node

UE

104: Signaling on the
multiple SRS
transmission occasions

500

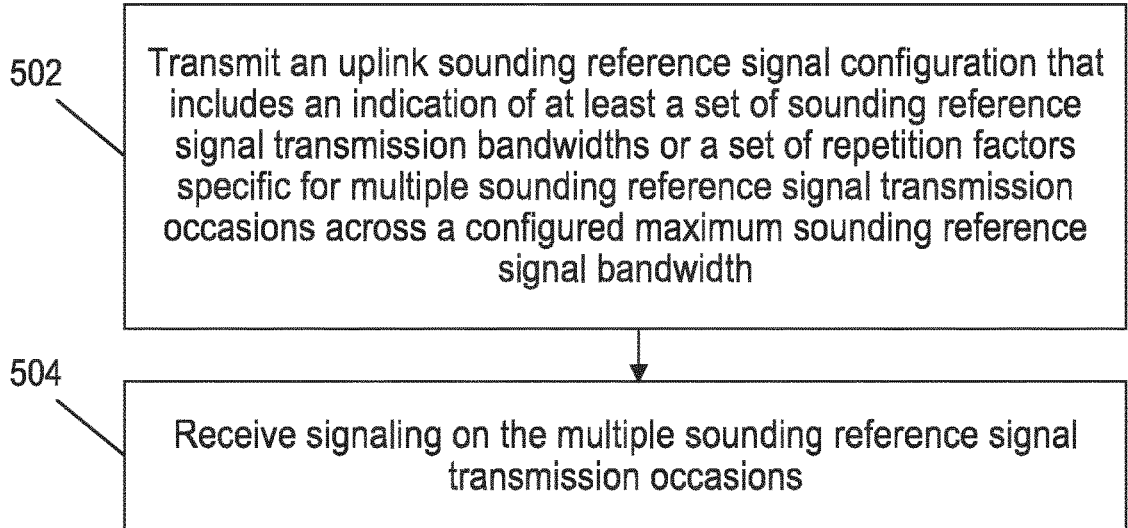

502

Transmit an uplink sounding reference signal configuration that includes an indication of at least a set of sounding reference signal transmission bandwidths or a set of repetition factors specific for multiple sounding reference signal transmission occasions across a configured maximum sounding reference signal bandwidth

504

Receive signaling on the multiple sounding reference signal transmission occasions

Receive an uplink sounding reference signal configuration that includes an indication of at least a set of sounding reference signal transmission bandwidths or a set of repetition factors specific for multiple sounding reference signal transmission occasions across a configured maximum sounding reference signal bandwidth

604

Transmit signaling on the multiple sounding reference signal transmission occasions

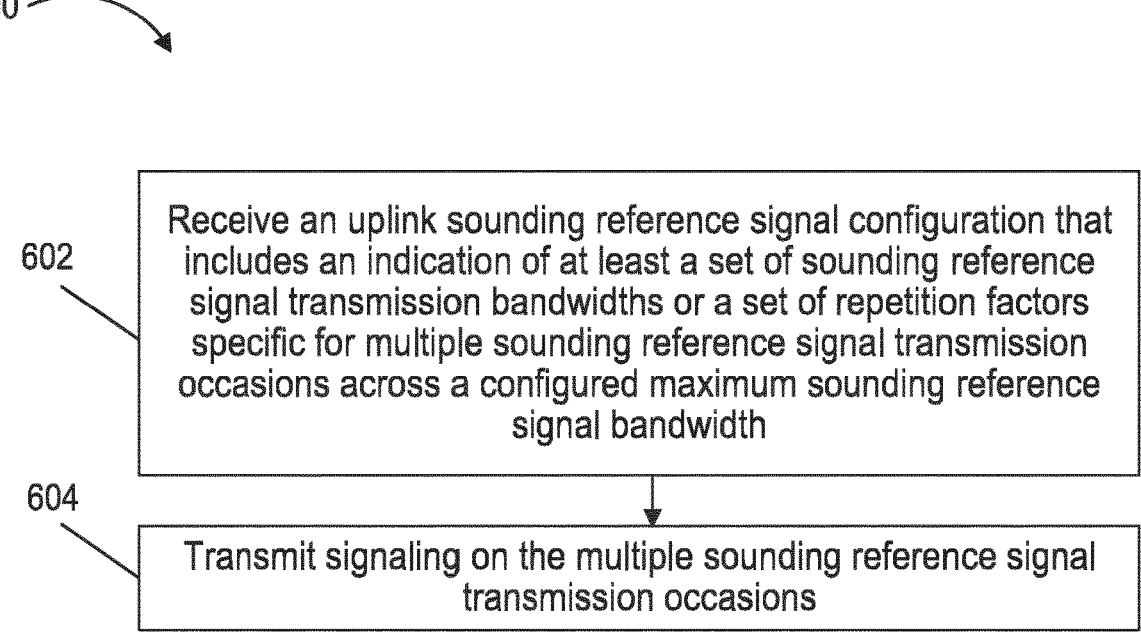

Fig. 6

UPLINK (UL) SOUNDING REFERENCE SIGNAL (SRS) RESOURCE CONFIGURATION

RELATED APPLICATION

This application was originally filed as PCT Application No. PCT/EP2022/058742, filed on Apr. 1, 2022, which claims priority from U.S. Provisional Application No. 63/171,392, filed on Apr. 6, 2021, each of which is incorporated herein by reference in its entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for uplink (UL) sounding reference signal (SRS) resource configuration.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. 5G is mostly built on a new radio (NR), but a 5G (or NG) network can also build on E-UTRA radio. It is estimated that NR may provide bitrates on the order of 10-20 Gbit/s or higher, and may support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) may be named gNB when built on NR radio, and may be named NG-eNB when built on E-UTRA radio.

SUMMARY

According to a first embodiment, an apparatus may include at least one processor and at least one memory including computer program code. The at least one memory and the computer program code may be configured to, with the at least one processor, cause the apparatus at least to transmit an uplink sounding reference signal configuration. The uplink sounding reference signal configuration may include an indication of at least a set of sounding reference signal transmission bandwidths or a set of repetition factors specific for multiple sounding reference signal transmission occasions across a configured maximum sounding reference signal bandwidth. The at least one memory and the computer program code may be configured to, with the at least one processor, cause the apparatus at least to receive signaling on the multiple sounding reference signal transmission occasions.

In a variant, the uplink sounding reference signal configuration may further include an indication of intra-slot or inter-slot time bundling of one or more resources. In a variant, the set of sounding reference signal transmission bandwidths or the set of repetition factors for the multiple sounding reference signal transmission occasions may include the set of repetition factors for the set of sounding reference signal transmission bandwidths per transmission time instant, per frequency hop, or per physical resource block set. In a variant, the at least one memory and the computer program code may be configured to, with the at least one processor, cause the apparatus, when receiving the signaling, at least to receive the signaling in consecutive or non-consecutive symbols in time defined by the set of repetition factors specific to the set of sounding reference signal transmission bandwidths. In a variant, the set of repetition factors may include different repetition factors specific for consecutive or non-consecutive symbols.

In a variant, the set of sounding reference signal transmission bandwidths or the set of repetition factors may be based on at least a power class, a modulation, waveforms, a band, a dual connectivity or uplink carrier aggregation band configuration, and/or a number of transmitter chains of a user equipment or channel bandwidth based on physical resource blocks or channel band covering a set of physical resource blocks associated with a specific carrier frequency. In some embodiments, the set of sounding reference signal transmission bandwidths may include different combinations of the set of sounding reference signal transmission bandwidths in the one or more resources with or without transmission repetition.

According to a second embodiment, an apparatus may include at least one processor and at least one memory including computer program code. The at least one memory and the computer program code may be configured to, with the at least one processor, cause the apparatus at least to receive an uplink sounding reference signal configuration. The uplink sounding reference signal configuration may include an indication of at least: a set of sounding reference signal transmission bandwidths or a set of repetition factors specific for multiple sounding reference signal transmission occasions across a configured maximum sounding reference signal bandwidth. The at least one memory and the computer program code may be configured to, with the at least one processor, cause the apparatus at least to transmit signaling on the multiple sounding reference signal transmission occasions.

In a variant, the uplink sounding reference signal configuration may further include an indication of intra-slot or inter-slot time bundling of one or more resources. In a variant, the set of sounding reference signal transmission bandwidths or the set of repetition factors for the multiple sounding reference signal transmission occasions may include the set of repetition factors for the set of sounding reference signal transmission bandwidths per transmission time instant, per frequency hop, or per physical resource block set. In a variant, the at least one memory and the computer program code may be configured to, with the at least one processor, cause the apparatus, when transmitting the signaling, at least to transmit the signaling in consecutive or non-consecutive symbols in time defined by the repetition factors specific to the set of sounding reference signal transmission bandwidths. In a variant, the set of repetition factors may include different repetition factors specific for consecutive or non-consecutive symbols. In a variant, the set of sounding reference signal transmission bandwidths or the set of repetition factors may be based on at least a power class, a modulation, waveforms, a band, a dual connectivity or uplink carrier aggregation band configuration, and/or a number of transmitter chains of the apparatus or channel bandwidth based on physical resource blocks or channel band covering a set of physical resource blocks associated with a specific carrier frequency.

In a variant, the set of sounding reference signal transmission bandwidths may include different combinations of the set of sounding reference signal transmission bandwidths in the one or more resources with or without transmission repetition. In a variant, the at least one memory and the computer program code may be configured to, with the at least one processor, cause the apparatus, when transmitting the signaling, at least to transmit the signaling using a same per physical resource block power for the one or more resources in one symbol.

According to a third embodiment, a method may include transmitting, by a network node, an uplink sounding reference signal configuration. The uplink sounding reference signal configuration may include an indication of at least: a set of sounding reference signal transmission bandwidths or a set of repetition factors specific for multiple sounding reference signal transmission occasions across a configured maximum sounding reference signal bandwidth. The method may include receiving signaling on the multiple sounding reference signal transmission occasions.

In a variant, the uplink sounding reference signal configuration may further include an indication of intra-slot or inter-slot time bundling of one or more resources. In a variant, the set of sounding reference signal transmission bandwidths or the set of repetition factors for the multiple sounding reference signal transmission occasions may include the set of repetition factors for the set of sounding reference signal transmission bandwidths per transmission time instant, per frequency hop, or per physical resource block set. In a variant, the receiving the signaling may further include receiving the signaling in consecutive or non-consecutive symbols in time defined by the set of repetition factors specific to the set of sounding reference signal transmission bandwidths. In a variant, the set of repetition factors may include different repetition factors specific for consecutive or non-consecutive symbols.

In a variant, the set of sounding reference signal transmission bandwidths or the set of repetition factors may be based on at least a power class, a modulation, waveforms, a band, a dual connectivity or uplink carrier aggregation band configuration, and/or a number of transmitter chains of a user equipment or channel bandwidth based on physical resource blocks or channel band covering a set of physical resource blocks associated with a specific carrier frequency. In a variant, the set of sounding reference signal transmission bandwidths may include different combinations of the set of sounding reference signal transmission bandwidths in the one or more resources with or without transmission repetition.

According to a fourth embodiment, a method may include receiving, by a user equipment, an uplink sounding reference signal configuration. The uplink sounding reference signal configuration may include an indication of at least: a set of sounding reference signal transmission bandwidths or a set of repetition factors specific for multiple sounding reference signal transmission occasions across a configured maximum sounding reference signal bandwidth. The method may include transmitting signaling on the multiple sounding reference signal transmission occasions.

In a variant, the uplink sounding reference signal configuration may further include an indication of intra-slot or inter-slot time bundling of one or more resources. In a variant, the set of sounding reference signal transmission bandwidths or the set of repetition factors for the multiple sounding reference signal transmission occasions may include the set of repetition factors for the set of sounding reference signal transmission bandwidths per transmission time instant, per frequency hop, or per physical resource block set. In a variant, the transmitting the signaling may further include transmitting the signaling in consecutive or non-consecutive symbols in time defined by the repetition factors specific to the set of sounding reference signal transmission bandwidths. In a variant, the set of repetition factors may include different repetition factors specific for consecutive or non-consecutive symbols. In a variant, the set of sounding reference signal transmission bandwidths or the set of repetition factors may be based on at least a power class, a modulation, waveforms, a band, a dual connectivity or uplink carrier aggregation band configuration, and/or a number of transmitter chains of the user equipment or channel bandwidth based on physical resource blocks or channel band covering a set of physical resource blocks associated with a specific carrier frequency.

In a variant, the set of sounding reference signal transmission bandwidths may include different combinations of the set of sounding reference signal transmission bandwidths in the one or more resources with or without transmission repetition. In a variant, the transmitting the signaling may further include transmitting the signaling using a same per physical resource block power for the one or more resources in one symbol.

A fifth embodiment may be directed to an apparatus that may include circuitry configured to cause the apparatus to perform the method according to the third embodiment or the fourth embodiment, or any of the variants of those embodiments discussed above.

A sixth embodiment may be directed to an apparatus that may include means for performing the method according to the third embodiment or the fourth embodiment, or any of the variants of those embodiments discussed above. Examples of the means may include one or more processors, memory, and/or computer program codes for causing the performance of the operation.

A seventh embodiment may be directed to a computer readable medium comprising program instructions stored thereon for causing an apparatus to perform at least the method according to the third embodiment or the fourth embodiment, or any of the variants of those embodiments discussed above.

An eighth embodiment may be directed to a computer program product encoding instructions for causing an apparatus to perform at least the method according to the third embodiment or the fourth embodiment, or any of the variants of those embodiments discussed above.

BRIEF DESCRIPTION OF THE DRAWINGS

For proper understanding of example embodiments, reference should be made to the accompanying drawings, wherein:

FIG. 5 illustrates an example flow diagram of a method, according to some embodiments.

FIG. 6 illustrates an example flow diagram of a method, according to some embodiments.

DETAILED DESCRIPTION

Figure 1:
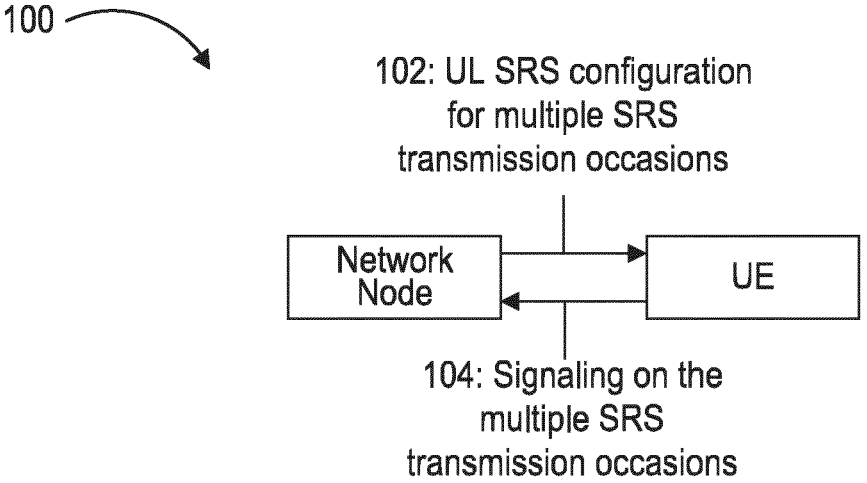
FIG. 1 illustrates an example of UL SRS resource configuration, according to some embodiments.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for UL SRS resource configuration is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar wording, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar wording, throughout this specification do not necessarily all refer to the same group of embodiments, and the described features, structures, or characteristics may be combined in any suitable manner in one or more example embodiments. In addition, the phrase "set of" refers to a set that includes one or more of the referenced set members. As such, the phrases "set of," "one or more of," and "at least one of," or equivalent phrases, may be used interchangeably. Further, "or" is intended to mean "and/or," unless explicitly stated otherwise.

Additionally, if desired, the different functions or operations discussed below may be performed in a different order and/or concurrently with each other. Furthermore, if desired, one or more of the described functions or operations may be optional or may be combined. As such, the following description should be considered as merely illustrative of the principles and teachings of certain example embodiments, and not in limitation thereof.

NR devices may operate using a beam-based mode, both below and above 6 gigahertz (GHz) carrier frequency range, where both transmitter and receiver use spatial domain beamforming (e.g., in analog or digital domain) at the transmit (TX) and/or receive (RX) sides to cover a propagation loss associated with a radio channel UEs can be equipped with multiple RX antenna panels associated with multiple antenna elements. Depending on UE reception capability, a set of UE antenna panels can be simultaneously used for reception. Both downlink (DL) and uplink (UL)

transmission schemes for reference signals (RSs), signals, and channels may enable more flexible and efficient support for multiple transmit-receive point (multi-TRP) operation.

With respect to UL SRS configuration, NR may provide support for UL SRS resource configuration with intra-slot frequency domain hopping with repetition, where the same set of subcarriers is sounded in consecutive 2 or 4 orthogonal frequency division multiplexing (OFDM) symbols within a slot before the next frequency hop occurs. Furthermore, SRS bandwidth (e.g., multiple minimum SRS bandwidth, such as 4 contiguous PRBs in frequency) can be flexibly configured such that an arbitrary portion of a bandwidth part (BWP) can be sounded, with or without frequency hopping within the sounded UL BWP.

NR may provide for 64 different UL SRS bandwidth configurations controlled by radio resource control (RRC) parameters $C_{SRS}$, $n_{shift}$, $B_{SRS}$, $b_{hop}$, and $n_{RRC}$. The combination of these parameters may define which portion of the BWP is sounded by a SRS resource. $C_{SRS}$ may define which bandwidth configuration out of 64 candidates (0 . . . 63) for the SRS resources is selected that can be configured with RRC. The parameter $n_{shift}$ may determine the index of the first PRB of the maximum SRS bandwidth (0 . . . 271). The parameter $B_{SRS}$ may define the index (0 . . . 3) that is associated SRS maximum bandwidth in PRBs for the resource. The combination of the $b_{hop}$ and $B_{SRS}$ defines whether frequency domain hopping is configured or not for the resource. The parameter $n_{RRC}$ may define a frequency domain position in a block of 4 physical resource blocks (PRBs) (0 . . . 67). As an example, a UL SRS resources configuration with frequency hopping may include a start position equal to 5, $C_{SRS}$=5, $B_{SRS}$=1, $b_{hop}$=0 where the total SRS sounding bandwidth is equal to 8 PRBs and with two equal size (4 PRBs) frequency hops.

NR may support the following SRS time domain behaviors: periodic, semi-persistent, and aperiodic transmissions. With semi-persistent SRS transmission, a medium access control (MAC) control element (CE) may be used to activate and deactivate a set of one or more SRS resources. While activated, an SRS resource is transmitted with a configured periodicity and slot offset. MAC-CE activation and deactivation may enable more dynamic on/off control compared to periodic SRS resources, which may be configured by RRC.

NR may have to provide mechanisms for UL SRS to enable more flexible triggering on aperiodic SRS sets. For instance, aspects of NR may apply to frequency range 1 (FR1) and frequency range 2 (FR2) and may have to provide aperiodic SRS triggering to facilitate more flexible triggering and/or downlink control information (DCI) overhead or usage reduction. In addition, these aspects may have to provide SRS switching for up to 8 antennas (e.g., xTyR, where, T and R may define the number of transmit and receive antenna ports, respectively, and x={1, 2, 4} as well as y={6, 8}), and may have to provide SRS time bundling, increased SRS repetition, and partial sounding across frequencies.

SRS capacity and coverage in NR may support an ability to increase the maximum number of repetition symbols in one slot and one SRS resource to S (where at least one S value from the set {8, 10, 12, 14} is supported). SRS capacity and coverage may additionally support transmission of SRS just in $$\frac{1}{P_F} m_{SRS,B_{SRS}}$$

contiguous resource blocks (RBs) in one OFDM symbol, where $P_F$ may represent a partial frequency sounding factor, $m_{SRS,B_{SRS}}$ may indicate the number of RBs configured by $B_{SRS}$ and $C_{SRS}$. Furthermore, SRS capacity and coverage may support comb 8 configurations.

As discussed above, NR may provide support for UL SRS resource configuration with frequency hopping where each equal size frequency hopping SRS transmission bandwidth resource is repeated in 2 or 4 consecutive OFDM symbols. Furthermore, the above-described aspects of NR may extend this concept by increasing the repetition factor from 4 up to 12 symbols. Moreover, these agreements may reduce the minimum SRS bandwidth from 4 to 1 PRB depending the value of $P_F$, which may have the following values: 2, 3, 4, 8. According to the NR SRS-related aspects described above, it may be possible to configure the UE to transmit SRS resource with frequency domain hopping associated with smaller SRS transmission bandwidth with larger repetition factor values.

With respect to UL TX power reduction, there may be several cases that allow a UE to reduce its maximum output power to comply with regulations and/or due to some UE radio frequency (RF) impairments. The followings are some of the examples. As one example for maximum power reduction (MPR) (output), a UE may be allowed to use the maximum power reduction (e.g., power back-off) values to meet out of band emissions. When the power reduction is realized, the UE may reduce the total TX power evenly across PRBs assigned for an active UL BWP in a UE channel bandwidth. Though different MPR(s) are used depending on combinations of many factors such the UE power class, modulations, waveforms (cyclic prefix (CP)-OFDM or discrete Fourier transform-spread (DFT-s)-OFDM), UE channel bandwidth, frequency range (e.g., FR1 (410 megahertz (MHz)-7125 MHz) or FR2 (24250 MHz-52600 MHz)), etc. the values may be a function of the number of RBs and its position in a channel bandwidth under a certain combination. Moreover, MPR values and the applicable conditions consisting of the number of RBs and their positions are symmetrical within the channel bandwidth. As another example for additional MPR (A-MPR), to fulfil additional emission requirements such as additional out-of-band emissions as well as additional spurious emission requirements, NR may provide support for the UE to use extra UL TX power reduction (e.g., power back-off). Unlike MPR, for A-MPR values, the applicable conditions consisting of the number of RBs and their positions are not symmetrical within the channel bandwidth. As such, if the same number of RBs are located at a lower edge of a UE channel bandwidth where the edge is closer to a system to be protected than the higher edge, the A-MPR at the lower edge RBs allocation may be larger than that at the higher edge RBs allocation even with the same number of RBs. As can be understood from the above, there may be a need for UL SRS resource configuration and related UE transmission procedures that facilitate aspects described above and/or overcome certain limitations of aspects of NR, such as the limitations of SRS resource configurations with frequency hopping and repetition.

As described above, to avoid out-of-band emissions (inter-modulation interference) to neighboring radio systems within a band, and provide extra band-specific robustness against additional spurious emissions, such as a protection of neighboring radio systems outside a band, NR defines UL power reduction values according to frequency location of transmitted PRBs within a channel bandwidth under a certain condition. For example, for frequency range one (FR1) with cyclic prefix (CP)-OFDM with quaternary phase-shift keying (QPSK) with UE power class 3 and edge or outer resource block (RB) allocation in a channel bandwidth, a UE may be allowed to use up to 3 decibels (dB) transmission power reduction (power back-off). Alternatively, for inner RB allocation, the value may be up to 1.5 dB. As a result of the UL TX power reduction, problems related to the coverage and quality degradation of SRS-based UL channel state information (CSI) or DL CSI acquisition can arise.

One way of avoiding coverage and quality degradation of the UL SRS may be to avoid configuring SRS resources at band edges (as used in LTE). However, this may result in an inefficient utilization of the spectrum, which is not desirable. Furthermore, due to TX power reduction, some portion of the UL BWP may require the UE to introduce TX power imbalance within the total SRS bandwidth.

As an example of the transmission power imbalance problem associated with UL SRS, a UE may be configured with UL SRS-based partial frequency sounding where the total SRS transmission bandwidth is divided into four different SRS transmissions (64 PRBs in each) covering the entire UL BWP (272 PRBs). Furthermore, the SRS resource may be configured with a repetition factor of four. In the partial frequency sounding, the total SRS bandwidth can be divided into one or more contiguous frequency portions (in PRBs from 1 up to 136 PRBs) that can be transmitted with two or more transmission time instants. To avoid out-off band emission, the UE may reduce its UL SRS transmissions power at one of the edges of a channel bandwidth with respect to the center of the channel bandwidth. Here, it can be assumed that the UE reduces 3 dB at edges and 1.5 dB at center of the UL BWP. The power reduction can be compensated by using repetition. In NR, the UE can be configured with a UL SRS resource with a repetition factor up to 12 symbols. Even though the potential coverage problem of the UL SRS can be partly covered with resource level repetition, the power imbalance problem may remain between different UL SRS transmission instants. As a result, the quality of UL CSI or DL CSI associated with active UL/DL BWP can be degraded. Furthermore, this may result in excessive UL SRS overhead with large repetition factors (up to 12) which is not desirable from the system perspective.

The problem of power imbalance between PRBs across total UL SRS sounding bandwidth can significantly limit the coverage and quality of UL/DL CSI acquisition resulting in significant performance degradation of multi-user multiple input/multiple output (MU-MIMO) transmissions in both UL and DL. When DL CSI acquisition for MU-MIMO transmission is carried out based on UL SRS sounding, the quality of UL SRS-based DL channel estimates may be relevant for non-codebook-based precoded MU-MIMO physical downlink shared channel (PDSCH) transmission.

As can be understood from the above, to reduce TX power imbalance and reference signal signaling overhead related to the UL SRS, there may be a need for a UL SRS resource configuration and related UE transmission procedures that enable more flexible and efficient use of system resources. This can be beneficial for very higher carrier frequencies, e.g., sub-terahertz range, where very large total transmission bandwidths (e.g., up 2.16 GHz) has to be sounded with UL SRS potentially with restrictions for out of band emissions.

Some embodiments described herein may provide for uplink (UL) sounding reference signal (SRS) resource configuration. In this regard, certain embodiments described herein may provide UL SRS resource configuration and related transmission procedures for intra-slot and inter-slot time bundling of one or more resources. In addition, certain embodiments may provide for adaptation of transmission bandwidth and/or repetition factors for SRS occasions. The adaptation may be performed across an SRS bandwidth, and on an intra-slot or inter-slot basis. More particularly, certain embodiments may provide for an SRS configuration that enables adaptation of transmission bandwidth per transmission occasion and use of different repetition factors per SRS transmission occasion, per transmitted PRB, per transmitted SRS bandwidth, and/or per frequency hop across consecutive and/or non-consecutive symbol instants. In this way, certain embodiments may provide a flexible way to overcome UL SRS transmission power imbalance among the PRBs across the UL SRS transmission bandwidth with reduced UL SRS transmission overhead and latency. This conserves network resources (e.g., bandwidth), improves the speed of communications between devices, and/or the like.

FIG. 1 illustrates an example 100 of UL SRS resource configuration, according to some embodiments. As illustrated in FIG. 1, the example 100 includes a network node and a UE.

As illustrated at 102, the network node may transmit, and the UE may receive, UL SRS configuration for multiple SRS transmission occasions. The UL SRS configuration may include an indication of at least transmission bandwidths or repetition factors for multiple SRS transmission occasions across a SRS bandwidth. In addition, the SRS configuration may include an indication of intra-slot and/or inter-slot time bundling of one or more resources. For intra-slot time-bundling of resources (aperiodic/periodic/semi-persistent), there may be an explicit higher layer parameter associated with a UL SRS resource set, e.g., time-bundling='ON/OFF' that may define whether resources within the resource set are time-bundled together (i.e., time-bundling='ON') or not (i.e., time-bundling='OFF'). When resources are configured as time-bundled, the UE may perform configured transmission across resources. For inter-slot time-bundling of aperiodic/semi-persistent resources, when one or more UL resource sets with time-bundling ON are triggered with DCI (aperiodic set) or activated with a medium access control control element (MAC CE) command (semi-persistent resource set), resources across set(s) may be time-bundled together. When triggered/activated resource UL SRS resource sets are configured as time-bundled, the UE may perform transmission of resource sets across resources over one or more triggered/activated UL SRS sets. In the case of de-activation of semi-persistent resource sets with MAC CE, the MAC CE command may deactivate indicated resource sets and may remove the bundling of different resource sets. For inter-slot time-bundling of periodic resources, there may be a separate higher layer (e.g., RRC) parameter indicating which periodic resources and/or resource sets are time-bundled.

In one example embodiment, in SRS resource or resource set configuration, or in repeated SRS transmission process settings, the indication may indicate a UL SRS PRB or PRB set (e.g., number of PRBs and/or frequency locations of configured PRBs) or SRS transmission bandwidth-specific repetition configuration and its related transmission procedure for intra-slot and inter-slot time-bundling. The UE may be configured with a repetition factor that is specific for SRS transmission bandwidth per transmission time instant (or that is frequency hop-specific), or for PRB set (e.g., different SRS transmission bandwidths and PRB sets can have different repetition factors). Certain embodiments may use a repetition mask covering sets of PRB and/or SRS transmission bandwidths per transmission time instant (or frequency hop). For example, a repetition mask vector with length of K may indicate K-different repetition factor values associated with K-different SRS transmission bandwidth time instants for a SRS resource. The repetition mask can be dynamically adapted with RRC, MAC, and/or layer 1 (L1) layer-based signalling mechanisms. For example, the set of repetition factor values can be preconfigured with RRC-signalling in a vector where each element of the vector may have a one-to-one mapping with a configured set of PRBs associated with the SRS transmission bandwidth per transmission time instant. The repetition factor associated with a preconfigured vector can be overwritten or updated with a MAC CE.

When UL SRS PRB or PRB set, or SRS transmission bandwidth-specific repetition is configured, the UE may repeat the set of PRBs or SRS transmission bandwidths in consecutive or non-consecutive symbols in time according to the PRB or SRS transmission bandwidth-specific repetition factor. The set of PRBs can cover either one or more PRBs assigned to SRS transmission bandwidths. When the UE is configured with repetition over non-consecutive symbols, a time offset between different PRB sets or SRS transmission bandwidths may be indicated. The time-offset can be common for multiple PRBs or SRS transmission bandwidths within the SRS resource or can be PRB or SRS transmission bandwidth-specific. Time offset may be determined by using the first SRS symbol within a resource as a reference. Additionally, a slot-offset can be configured between PRB sets or SRS transmission bandwidths. The purpose of the slot-offset may enable distribution of a resource across different slots. A PRB set or transmission bandwidth specific slot-offset may be different compared to aperiodic SRS resource set specific slot-offset. Slot-offset may be determined by using a slot as a reference slot where the first set of PRBs or symbol of a resource is located. Additionally, or alternatively, a PRB or SRS transmission bandwidth repetition factor may depend on, or be associated with, a transmitter power class.

In another example embodiment, the UL SRS configuration may include an indication of a symbol-specific repetition (e.g., different repetition factors between consecutive or non-consecutive symbols). For example, SRS symbols may be repeated on certain SRS symbols per transmission bandwidth associated with a time instant. Other SRS symbols may be repeated after the previous symbol is repeated. SRS symbols may be repeated by using configured SRS resources after the last SRS symbol in a certain transmission bandwidth. Repeated SRS symbols may be allocated separately with configuration signalling which may be indicated by, e.g., a repetition flag in a configuration message.

In another example embodiment, UL SRS PRB and/or SRS transmission band-specific repetition procedures can be triggered according to the power class, modulation, the band, dual connectivity (DC) or UL carrier aggregation (CA) band configuration, and/or the number of transmitter chains of the UE transmitter. Further adjustments to the repetition factor can be made by SRS measurements on a certain bandwidth at the network node (a corresponding change may be configured to the transmitter in next configuration instance). Repetition mode may be active until the SRS bandwidth configuration is changed so that repetition is no longer needed. If an updated repetition configuration for SRS transmission bandwidth is configured, then it may be associated with the next available transmission instance.

In another example embodiment, the SRS configuration may indicate an adaptation of SRS transmission bandwidth within a SRS resource with symbol, PRB, or SRS transmission bandwidth-specific repetition. The UE can be configured to have different SRS bandwidth combinations within one SRS resource with or without repetition. In another example embodiment, the configured SRS resources may be transmitted in such a way that the per PRB power used for the transmission of the SRS is the same across the SRS resources in an OFDM symbol.

In some embodiments, the UE may transmit, and the network node may receive, an indication that the UE supports one or more of the above configurations prior to the network node transmitting at 102. This may conserve network resources and/or computing resources by reducing or eliminating transmission of configurations that the UE does not support.

As illustrated at 104, the UE may transmit, and the network node may receive, signaling on the multiple SRS transmission occasions. For example, the UE may transmit the signaling according to the UL SRS configuration that the network node transmitted at 102. Aspects of the transmission by the UE are described in more detail below with respect to FIGS. 2-4.

As described above, FIG. 1 is provided as an example. Other examples are possible, according to some embodiments.

Figure 2:
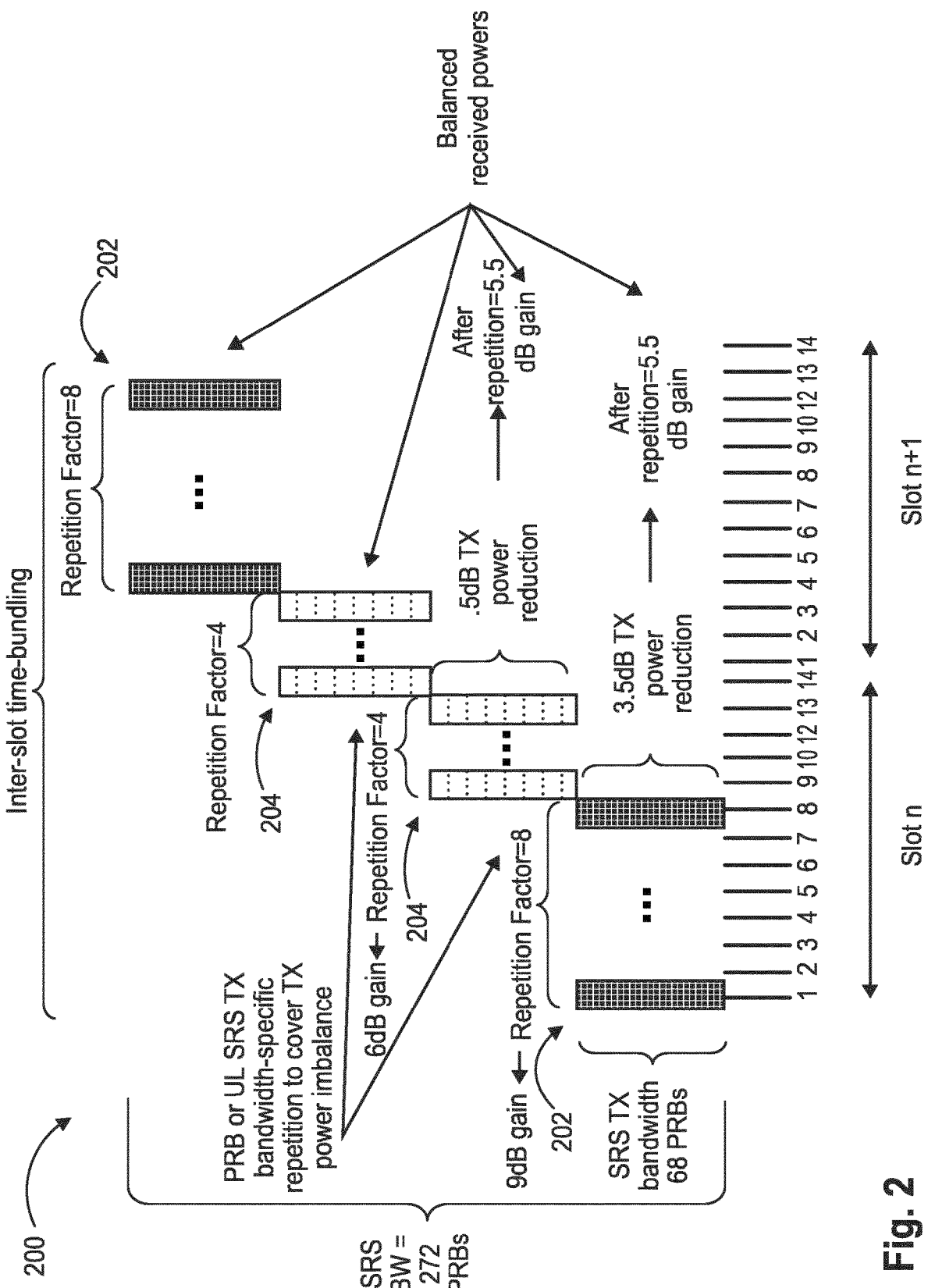
FIG. 2 illustrates an example of UL SRS transmission with physical resource block (PRB) set level repetition, according to some embodiments.

FIG. 2 illustrates an example 200 of UL SRS transmission with PRB set level repetition, according to some embodiments. The example 200 illustrates UL SRS resource transmission with PRB-specific repetition. The UE may be configured with a UL SRS resource configuration where a set of repetition factors is associated with the set of PRBs associated with SRS transmission bandwidth with different symbol time instants. Two set of PRBs illustrated at 202 (e.g., 68 PRBs in each set) may be configured with a repetition factor of 8 at channel bandwidth edges and two PRB sets illustrated at 204 (e.g., 68 PRBs in each set) associated with the center of the channel bandwidth may be configured with a repetition factor of 4. The UE may reduce its transmission power by 3.5 dB for the set of PRBs at 202 associated with channel bandwidth edges and 0.5 dB for the set of PRBs at 204 at the center of the channel bandwidth for power class 2 (PC2) UEs. As a result of PRB set specific repetition, received power levels of different PRBs across the SRS bandwidth may be balanced with each other and the impact of power back-off may be mitigated.

As indicated above, FIG. 2 is provided as an example. Other examples are possible, according to some embodiments.

Figure 3:
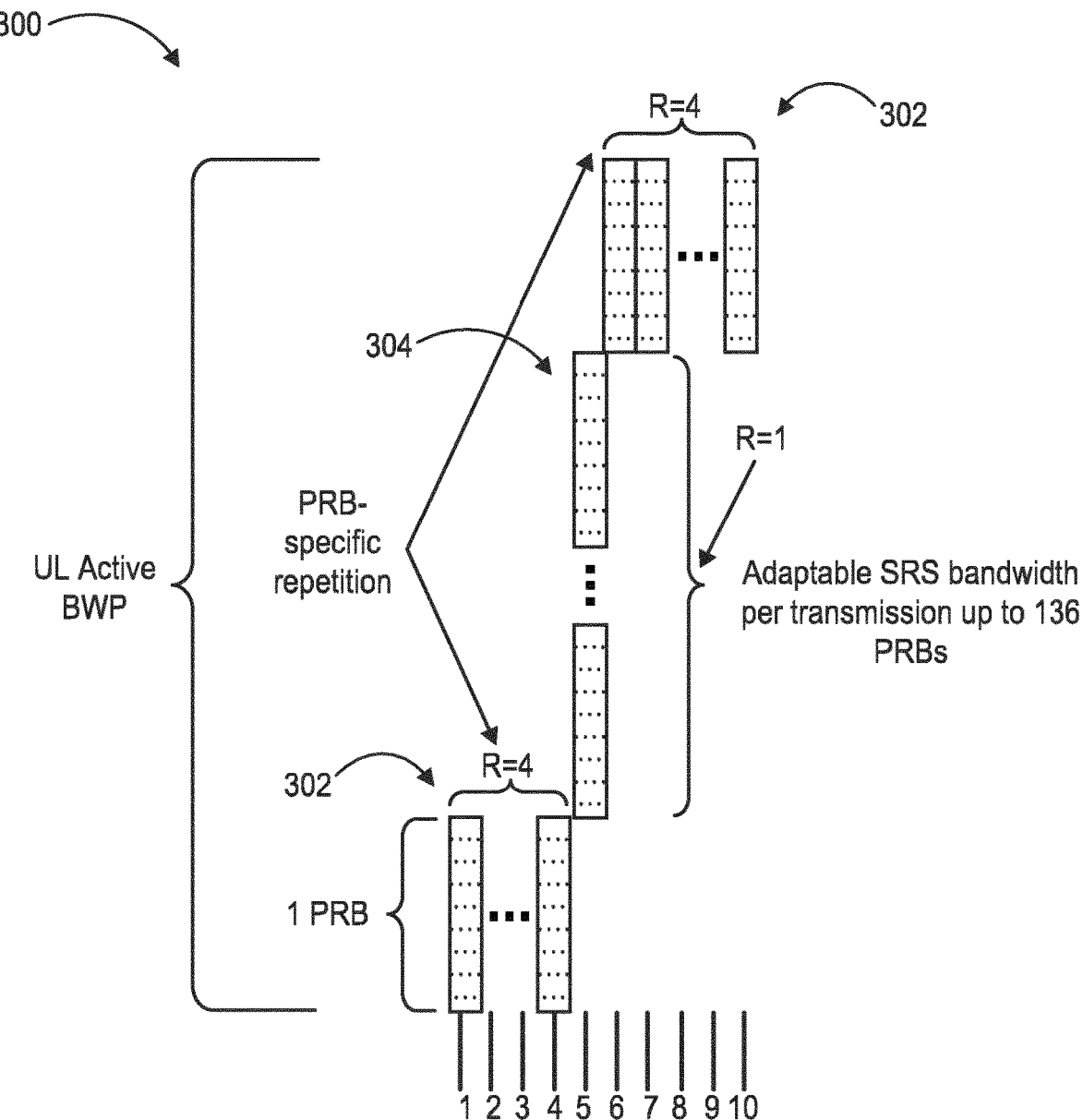
FIG. 3 illustrates an example of UL SRS transmission with PRB-related repetition and transmission occasion-related SRS bandwidth, according to some embodiments.

FIG. 3 illustrates an example 300 of UL SRS transmission with PRB-related repetition and transmission occasion-related SRS bandwidth, according to some embodiments. The example 300 illustrates a UL SRS resource configuration where SRS transmission bandwidth and repetition associated with sets of PRBs can be adapted per UL SRS transmission occasion. Compared with the example 200 illustrated in FIG. 2, the SRS transmission bandwidth in the example 300 can be different according to transmission occasions. As a result, it may be possible to configure the SRS transmission for some specific portions of the transmission bandwidth illustrated at 302 (e.g., at channel bandwidth edges) with larger repetition factors and some portions of the bandwidth illustrated at 304 (e.g., at channel bandwidth center) with smaller repetition factors and larger SRS bandwidth. In this way, UL SRS transmission overhead can be optimized by varying repetition and SRS bandwidth per transmission occasion.

As described above, FIG. 3 is provided as an example. Other examples are possible, according to some embodiments.

Figure 4:
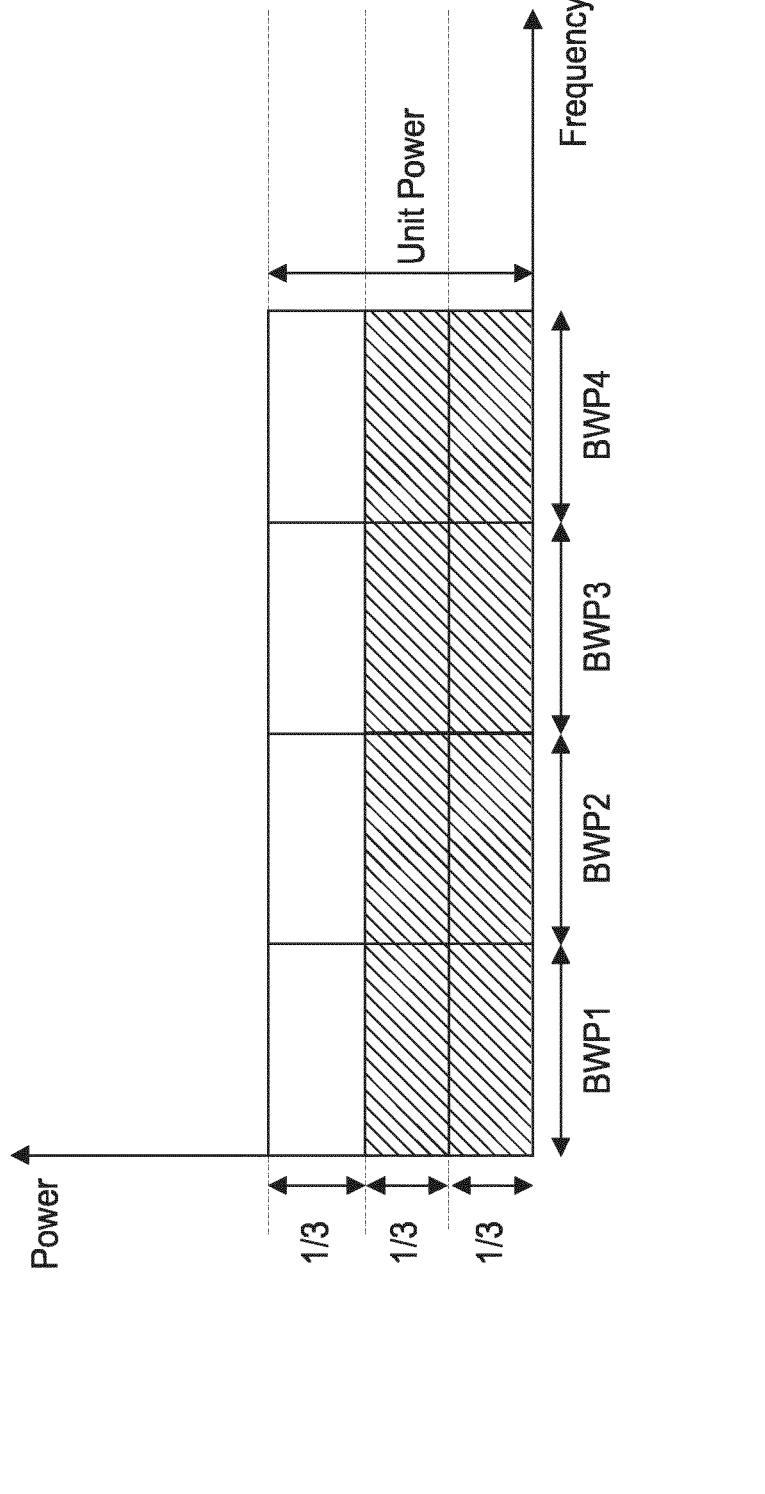
FIG. 4 illustrates an example of allocated power on the PRBs used for sounding in a time instance, according to some embodiments.

FIG. 4 illustrates an example 400 of allocated power on the PRBs used for sounding in a time instance, according to some embodiments. The example 400 illustrates SRS resource allocation and power control where the same power levels are achieved across the configured resources, including cell edge resources. The example 400 includes 4 BWP allocations, however, these can also be PRBs in the same BWP allocation in some embodiments. In the example 400, BWP1 and BWP4 are located at the edge of the channel, while BWP2 and BWP3 are non-edge allocations. The power from the center PRBs may be pooled on the edge PRBs, allowing the same power level on the PRB set which is intended to be transmitted at the same time. This provides advantages as the edge resources are typically constrained differently compared to other non-edge resources in terms of power control. For instance, these different constraints would ordinarily cause different power levels to be used for the edge BPWs. This is however suboptimal as, for example, the UE is unable to perform the sounding of all four BPWs/allocations in the same time. With the restrictions in NR, even if half power is used across all PRBs for both BWP1 and BWP2, allowing same power allocation across all the BWPs, the achievable power level would be less than that if, according to some embodiments, power pooling is allowed across PRBs.

As described above, FIG. 4 is provided as an example. Other examples are possible, according to some embodiments.

FIG. 5 illustrates an example flow diagram of a method 500, according to some embodiments. For example, FIG. 5 may illustrate example operations of a network node (e.g., apparatus 10 illustrated in, and described with respect to, FIG. 7a). Some of the operations illustrated in FIG. 5 may be similar to some operations shown in, and described with respect to, FIGS. 1-4.

In an embodiment, the method 500 may include, at 502, transmitting an uplink sounding reference signal configuration that includes an indication of at least a set of sounding reference signal transmission bandwidths or a set of repetition factors specific for multiple sounding reference signal transmission occasions across a configured maximum sounding reference signal bandwidth, e.g., in a manner similar to that at 102 of FIG. 1. The method 500 may include, at 504, receiving signaling on the multiple sounding reference signal transmission occasions, e.g., in a manner similar to that at 104 of FIG. 1.

The method 500 illustrated in FIG. 5 may include one or more additional aspects described below or elsewhere herein. In some embodiments, the uplink sounding reference signal configuration may further include an indication of intra-slot or inter-slot time bundling of one or more resources. In some embodiments, the set of sounding reference signal transmission bandwidths or the set of repetition factors for the multiple sounding reference signal transmission occasions may include the set of repetition factors for the set of sounding reference signal transmission bandwidths per transmission time instant, per frequency hop, or per physical resource block (PRB) set. In some embodiments, the receiving at 504 may include receiving the signaling in consecutive or non-consecutive symbols in time defined by the set of repetition factors specific to the set of sounding reference signal transmission bandwidths. In some embodiments, the set of repetition factors may include different repetition factors specific for consecutive or non-consecutive symbols. In some embodiments, the set of sounding reference signal transmission bandwidths or the set of repetition factors may be based on at least a power class, a modulation, waveforms, a band, a DC and/or UL CA band configuration, and/or the number of transmitter chains of a user equipment, or channel bandwidth in terms of physical resource blocks or channel band covering a set of physical resource blocks associated with a specific carrier frequency. In some embodiments, the set of sounding reference signal transmission bandwidths may include different combinations of the set of sounding reference signal transmission bandwidths in the one or more resources with or without transmission repetition.

As described above, FIG. 5 is provided as an example. Other examples are possible according to some embodiments.

FIG. 6 illustrates an example flow diagram of a method 600, according to some embodiments. For example, FIG. 6 may illustrate example operations of a UE (e.g., apparatus 20 illustrated in, and described with respect to, FIG. 7b). Some of the operations illustrated in FIG. 6 may be similar to some operations shown in, and described with respect to, FIGS. 1-4.

In an embodiment, the method may include, at 602, receiving an uplink sounding reference signal configuration that includes an indication of at least a set of sounding reference signal transmission bandwidths or a set of repetition factors specific for multiple sounding reference signal transmission occasions across a configured maximum sounding reference signal bandwidth, e.g., in a manner similar to that at 102 of FIG. 1. The method 600 may include, at 604, transmitting signaling on the multiple sounding reference signal transmission occasions, e.g., in a manner similar to that at 104 of FIG. 1.

The method 600 illustrated in FIG. 6 may include one or more additional aspects described below or elsewhere herein. In some embodiments, the uplink sounding reference signal configuration may further include an indication of intra-slot or inter-slot time bundling of one or more resources. In some embodiments, the set of sounding reference signal transmission bandwidths or the set of repetition factors for the multiple sounding reference signal transmission occasions may include the set of repetition factors for the set of sounding reference signal transmission bandwidths per transmission time instant, per frequency hop, or per physical resource block set. In some embodiments, the transmitting at 604 may include transmitting the signaling in consecutive or non-consecutive symbols in time defined by the repetition factors specific to the sounding reference signal transmission bandwidths. In some embodiments, the set of repetition factors may include different repetition factors specific for consecutive or non-consecutive symbols. In some embodiments, the set of sounding reference signal transmission bandwidths or the set of repetition factors may be based on at least a power class, a modulation, waveforms, a band, a DC and/or UL CA band configuration, and/or the number of transmitter chains of the user equipment, or channel bandwidth based on physical resource blocks or channel band covering a set of physical resource blocks associated with a specific carrier frequency. In some embodiments, the set of sounding reference signal transmission bandwidths may include different combinations of the set of sounding reference signal transmission bandwidths in the one or more resources with or without transmission repetition. In some embodiments, the method 600 may further include transmitting the signaling using a same per physical resource block power for the one or more resources in one symbol.

As described above, FIG. 6 is provided as an example. Other examples are possible according to some embodiments.

Figures 7A, 7B:
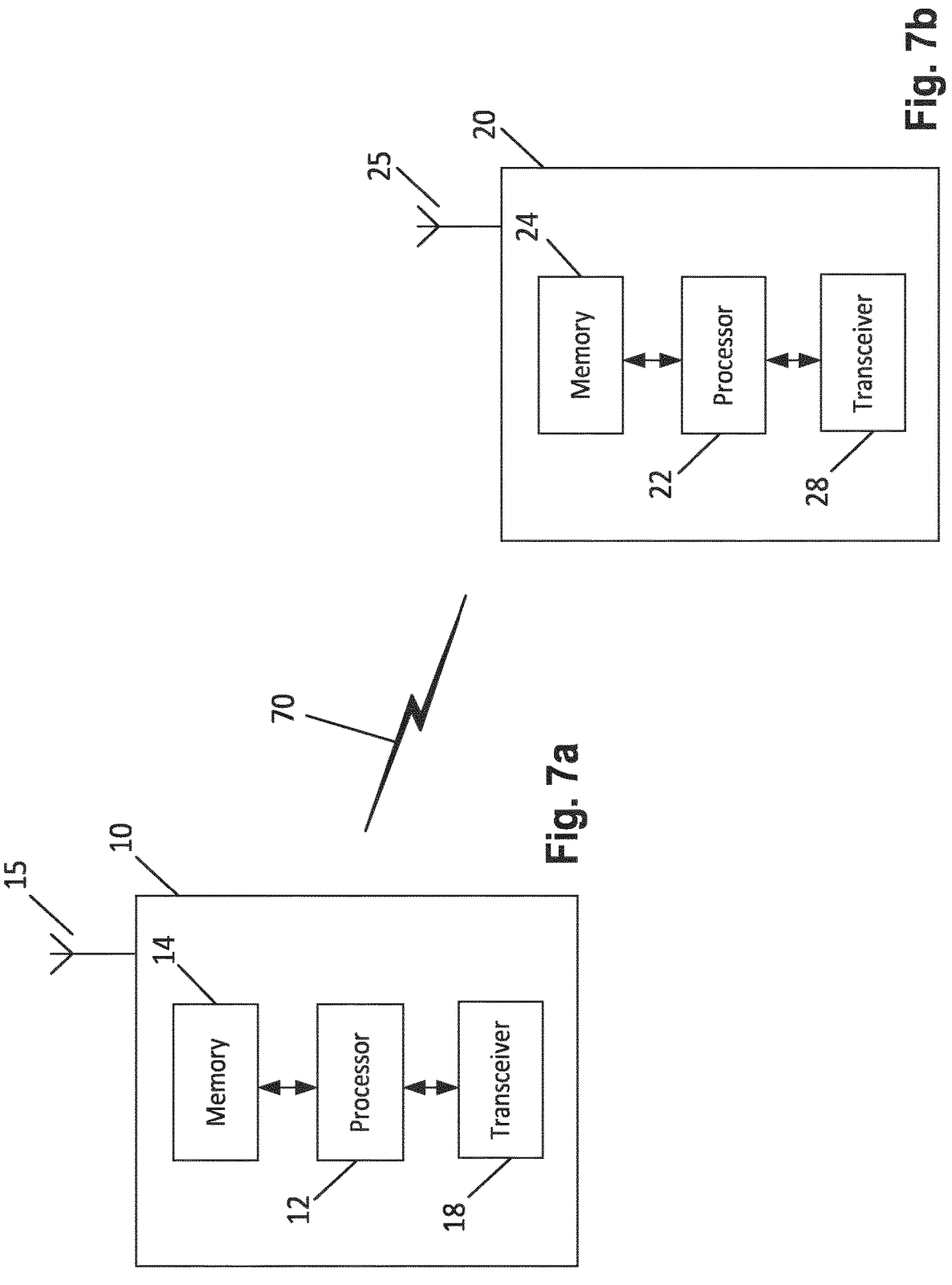
FIG. 7a illustrates an example block diagram of an apparatus, according to an embodiment.
FIG. 7b illustrates an example block diagram of an apparatus, according to another embodiment.

FIG. 7a illustrates an example of an apparatus 10 according to an embodiment. In an embodiment, apparatus 10 may be a node, host, or server in a communications network or serving such a network. For example, apparatus 10 may be a network node, satellite, base station, a Node B, an evolved Node B (eNB), 5G Node B or access point, next generation Node B (NG-NB or gNB), and/or a WLAN access point, associated with a radio access network, such as a LTE network, 5G or NR. In some example embodiments, apparatus 10 may be an eNB in LTE or gNB in 5G.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 7a.

As illustrated in the example of FIG. 7a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 7a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like.

According to certain embodiments, apparatus 10 may be controlled by memory 14 and processor 12 to perform the functions associated with any of the embodiments described herein, such as some operations illustrated in, or described with respect to, FIGS. 1-5. For instance, apparatus 10 may be controlled by memory 14 and processor 12 to perform the method of FIG. 5.

FIG. 7b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 7b.

As illustrated in the example of FIG. 7b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 7b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry. As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with any of the embodiments described herein, such as some operations illustrated in, or described with respect to, FIGS. 1-4 and 6. For instance, in one embodiment, apparatus 20 may be controlled by memory 24 and processor 22 to perform the method of FIG. 6.

In some embodiments, an apparatus (e.g., apparatus 10 and/or apparatus 20) may include means for performing a method or any of the variants discussed herein, e.g., a method described with reference to FIG. 5 or 6. Examples of the means may include one or more processors, memory, and/or computer program code for causing the performance of the operation.

Therefore, certain example embodiments provide several technological improvements, enhancements, and/or advantages over existing technological processes. For example, one benefit of some example embodiments is mitigation of transmission power imbalance due to inter-band emissions restrictions by allowing equalized received power levels across the SRS bandwidth with reduced UL SRS transmission overhead. In addition, another benefit of some example embodiments includes reducing or eliminating a need for restrictions with respect to different power back-off levels for edge PRBs and non-edge PRBs. Accordingly, the use of some example embodiments results in improved functioning of communications networks and their nodes and, therefore constitute an improvement at least to the technological field of SRS configurations, among others.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations used for implementing functionality of an example embodiment may be performed as routine(s), which may be implemented as added or updated software routine(s). In one example, software routine(s) may be downloaded into the apparatus.

As an example, software or a computer program code or portions of code may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein apply equally to both singular and plural implementations, regardless of whether singular or plural wording is used in connection with describing certain embodiments. For example, an embodiment that describes operations of a single network node equally applies to embodiments that include multiple instances of the network node, and vice versa.

One having ordinary skill in the art will readily understand that the example embodiments as discussed above may be practiced with operations in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

| PARTIAL GLOSSARY | |
| --- | --- |
| BWP | Bandwidth Part |
| CP | Cyclic Prefix |
| DCI | Downlink Control Information |
| DFT | Discrete Fourier Transform |
| DL | Downlink |
| MPR | Maximum Power Reduction |
| OFDM | Orthogonal Frequency Division Multiplexing |
| PDSCH | Physical Downlink Shared Channel |
| PRB | Physical Resource Block |
| PUCCH | Physical Uplink Control Channel |
| PUSCH | Physical Uplink Shared Channel |
| QCL | Quasi-Co-Location |
| RB | Resource Block |
| RSRP | Reference Signal Received Power |
| RX | Receive |
| SRS | Sounding Reference Signal |
| SRI | Sounding Reference Signal Resource Indicator |
| TRP | Transmit-Receive Point |
| TX | Transmit |
| UL | Uplink |

We claim:

1. A method, comprising:

receiving, by a user equipment, an uplink sounding reference signal configuration, wherein the uplink sounding reference signal configuration comprises indications of at least:

a first repetition factors specific for multiple sounding reference signal transmission occasions in a center part of a sounding reference signal bandwidth and a second repetition factor specific for multiple sounding reference signal transmission occasions in edge parts of the sounding reference signal bandwidth, the second repetition factor being higher than the first repetition factor; and transmitting sounding reference signals on the multiple sounding reference signal transmission occasions, wherein sounding reference signals transmitted with the first repetition factor are transmitted at a higher power than sounding reference signals transmitted with the second repetition factor.

2. The method according to claim 1, wherein the uplink sounding reference signal configuration further comprises an indication of intra-slot or inter-slot time bundling of one or more resources.

3. The method according to claim 1, wherein the set of sounding reference signal transmission bandwidths or the set of repetition factors for the multiple sounding reference signal transmission occasions comprise the set of repetition factors for the set of sounding reference signal transmission bandwidths per transmission time instant, per frequency hop, or per physical resource block set.

4. The method according to claim 1, wherein the transmitting the signaling further comprises:

transmitting the signaling in consecutive or non-consecutive symbols in time defined by the repetition factors specific to the set of sounding reference signal transmission bandwidths.

5. The method according to claim 1, wherein the set of repetition factors comprise different repetition factors specific for consecutive or non-consecutive symbols.

6. An apparatus, comprising:

at least one processor; and at least one memory including computer program code, wherein the at least one memory and the computer program code are configured to, with the at least one processor, cause the apparatus at least to:

transmit an uplink sounding reference signal configuration, wherein the uplink sounding reference signal configuration comprises indications of at least:

a first repetition factors specific for multiple sounding reference signal transmission occasions in a center part of a sounding reference signal bandwidth and a second repetition factor specific for multiple sounding reference signal transmission occasions in edge parts of the sounding reference signal bandwidth, the second repetition factor being higher than the first repetition factor; and receive signaling on the multiple sounding reference signal transmission occasions, sounding reference signals received with the first repetition factor being received at a higher power than sounding reference signals received with the second repetition factor.

7. The apparatus according to claim 6, wherein the uplink sounding reference signal configuration further comprises an indication of intra-slot or inter-slot time bundling of one or more resources.

8. The apparatus according to claim 6, wherein the set of sounding reference signal transmission bandwidths or the set of repetition factors for the multiple sounding reference signal transmission occasions comprise the set of repetition factors for the set of sounding reference signal transmission bandwidths per transmission time instant, per frequency hop, or per physical resource block set.

9. The apparatus according to claim 6, wherein the at least one memory and the computer program code are configured to, with the at least one processor, cause the apparatus, when receiving the signaling, at least to:

receive the signaling in consecutive or non-consecutive symbols in time defined by the set of repetition factors specific to the set of sounding reference signal transmission bandwidths.

10. The apparatus according to claim 6, wherein the set of repetition factors comprise different repetition factors specific for consecutive or non-consecutive symbols.

11. The apparatus according to claim 6, wherein the set of sounding reference signal transmission bandwidths or the set of repetition factors are based on at least a power class, a modulation, waveforms, a band, a dual connectivity or uplink carrier aggregation band configuration, or a number of transmitter chains of a user equipment or channel bandwidth based on physical resource blocks or channel band covering a set of physical resource blocks associated with a specific carrier frequency.

12. The apparatus according to claim 6, wherein the set of sounding reference signal transmission bandwidths comprise different combinations of the set of sounding reference signal transmission bandwidths in the one or more resources with or without transmission repetition.

13. An apparatus, comprising:

at least one processor; and at least one memory including computer program code, wherein the at least one memory and the computer program code are configured to, with the at least one processor, cause the apparatus at least to:

receive an uplink sounding reference signal configuration, wherein the uplink sounding reference signal configuration comprises indications of at least:

a first repetition factors specific for multiple sounding reference signal transmission occasions in a center part of a sounding reference signal bandwidth and a second repetition factor specific for multiple sounding reference signal transmission occasions in edge parts of the sounding reference signal bandwidth, the second repetition factor being higher than the first repetition factor; and transmit sounding reference signals on the multiple sounding reference signal transmission occasions, wherein sounding reference signals transmitted with the first repetition factor are transmitted at a higher power than sounding reference signals transmitted with the second repetition factor.

14. The apparatus according to claim 13, wherein the uplink sounding reference signal configuration further comprises an indication of intra-slot or inter-slot time bundling of one or more resources.

15. The apparatus according to claim 13, wherein the set of sounding reference signal transmission bandwidths or the set of repetition factors for the multiple sounding reference signal transmission occasions comprise the set of repetition factors for the set of sounding reference signal transmission bandwidths per transmission time instant, per frequency hop, or per physical resource block set.

16. The apparatus according to claim 13, wherein the at least one memory and the computer program code are configured to, with the at least one processor, cause the apparatus, when transmitting the signaling, at least to:

transmit the signaling in consecutive or non-consecutive symbols in time defined by the repetition factors specific to the set of sounding reference signal transmission bandwidths.

17. The apparatus according to claim 13, wherein the set of repetition factors comprise different repetition factors specific for consecutive or non-consecutive symbols.

18. The apparatus according to claim 13, wherein the set of sounding reference signal transmission bandwidths or the set of repetition factors are based on at least a power class, a modulation, waveforms, a band, a dual connectivity or uplink carrier aggregation band configuration, or a number of transmitter chains of the apparatus or channel bandwidth based on physical resource blocks or channel band covering a set of physical resource blocks associated with a specific carrier frequency.

19. The apparatus according to claim 13, wherein the set of sounding reference signal transmission bandwidths comprise different combinations of the set of sounding reference signal transmission bandwidths in the one or more resources with or without transmission repetition.

20. The apparatus according to claim 13, wherein the at least one memory and the computer program code are configured to, with the at least one processor, cause the apparatus, when transmitting the signaling, at least to:

transmit the signaling using a same per physical resource block power for the one or more resources in one symbol.

* * * * *